(No Model.) 2 Sheets—Sheet 1.
W. H. GIBSON.
APPLIANCE FOR TEACHING BOTANY.
No. 496,257. Patented Apr. 25, 1893.
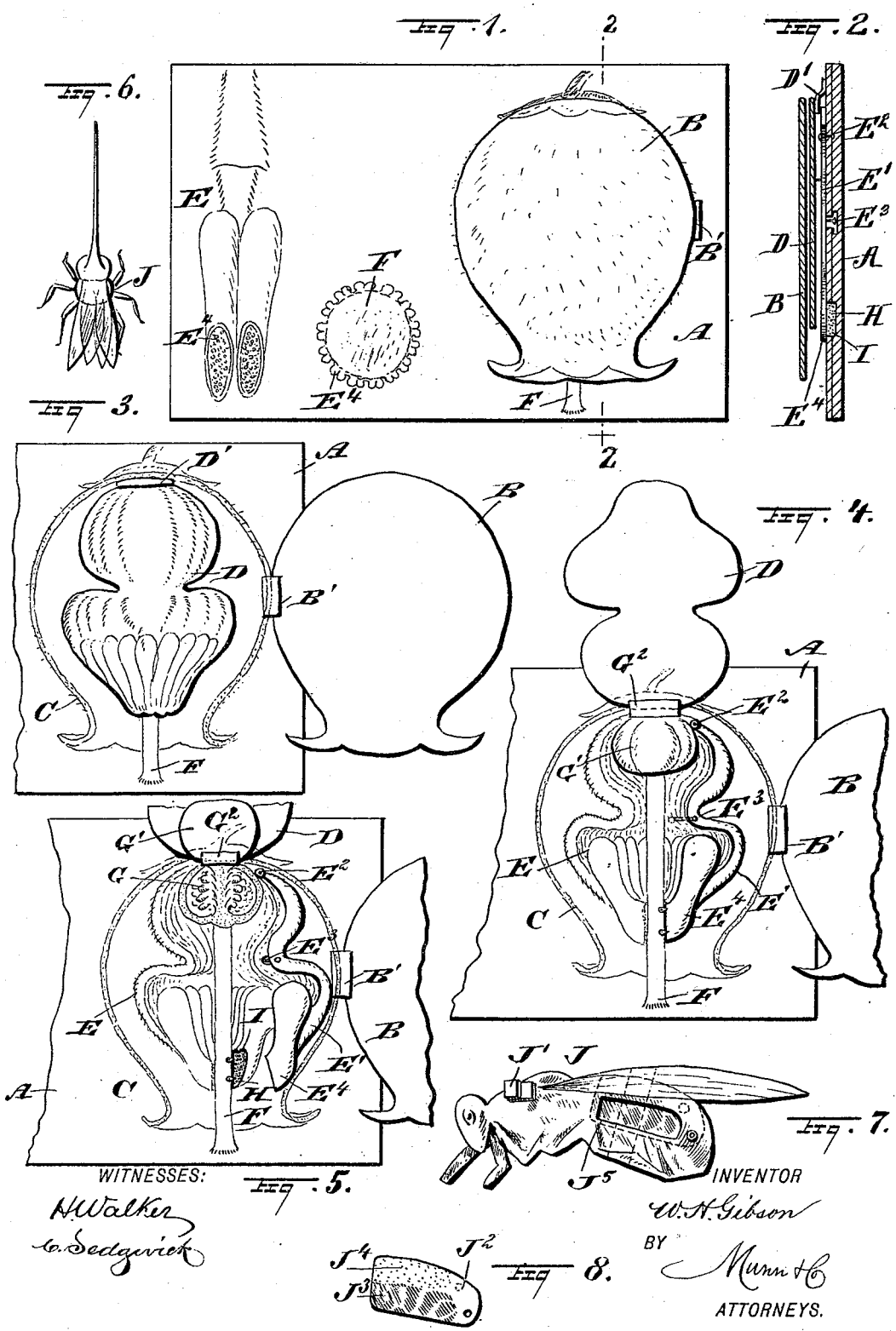
WITNESSES:
H. Walker
C. Sedgwick
INVENTOR
W. H. Gibson
BY
Munn & Co.
ATTORNEYS.

(No Model.) 2 Sheets—Sheet 2.
W. H. GIBSON.
APPLIANCE FOR TEACHING BOTANY.
No. 496,257. Patented Apr. 25, 1893.
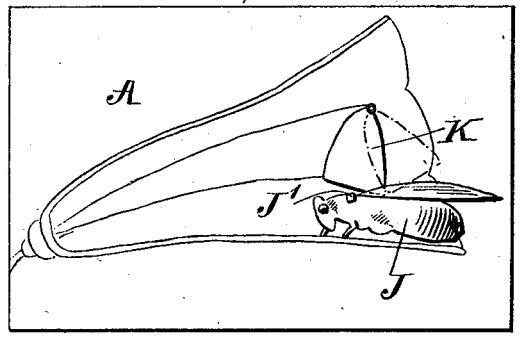
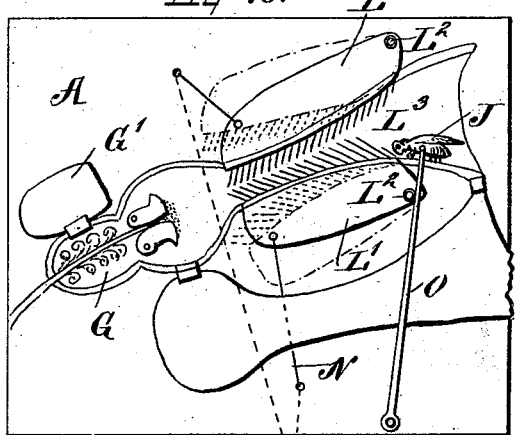
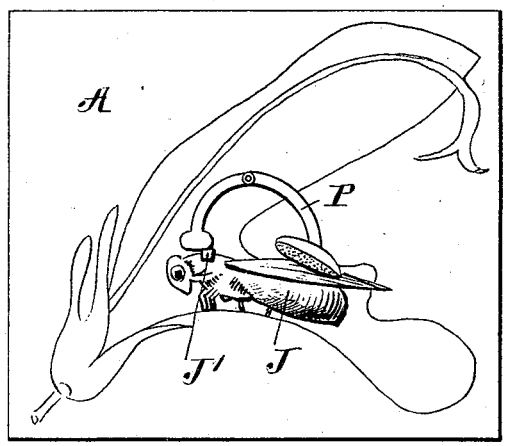
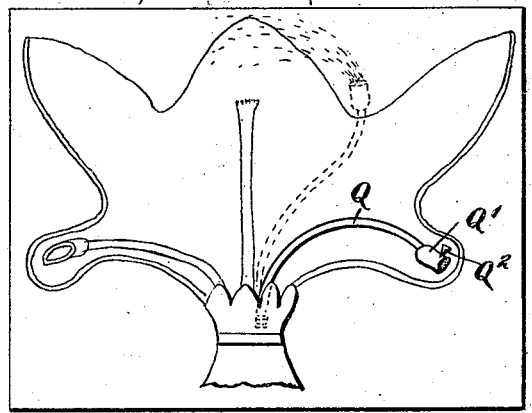
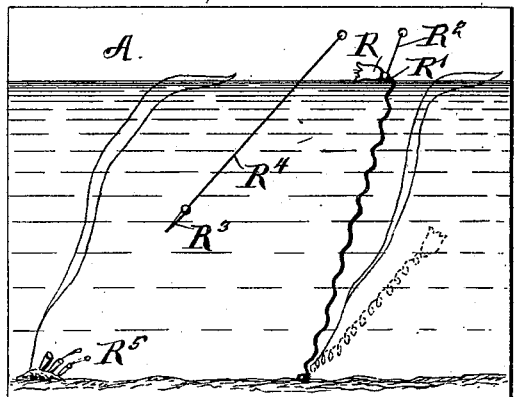
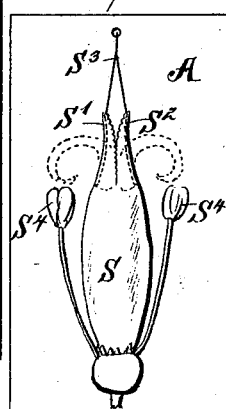
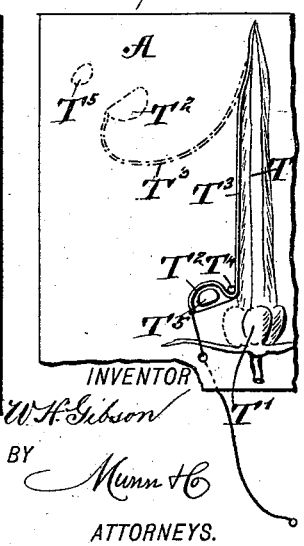
WITNESSES:
H. Walker
C. Sedgwick
INVENTOR
W. H. Gibson
BY
Munn & Co
ATTORNEYS.

UNITED STATES PATENT OFFICE.

WILLIAM HAMILTON GIBSON, OF WASHINGTON, CONNECTICUT.

APPLIANCE FOR TEACHING BOTANY.

SPECIFICATION forming part of Letters Patent No. 496,257, dated April 25, 1893.

Application filed October 15, 1892. Serial No. 448,934. (No model.)

*To all whom it may concern:*

Be it known that I, WILLIAM HAMILTON GIBSON, of Washington, in the county of Litchfield and State of Connecticut, have invented certain new and Improved Appliances for Teaching Botany, of which the following is a full, clear, and exact description.

The invention relates to educational appliances for use in schools, colleges, and on the lecturing platform; and the object of the invention is to provide a new and improved mechanical appliance for conveniently and readily demonstrating the construction of plants and the means employed for fertilization or fecundation, and cross-fertilization and dissemination or dispersion of seed and fruit.

The invention consists principally of a mechanical plant, and means for actuating the floral parts and the seed receptacle and seed.

The invention also consists in certain parts and details and combinations of the same, as will be described hereinafter and the npointed out in the claims.

Reference is to be had to the accompanying drawings forming a part of this specification, in which similar letters of reference indicate corresponding parts in all the figures.

Figure 1 is a front view of the improvement arranged for cross-fertilization and in a closed position. Fig. 2 is a transverse section of the same on the line 2—2 of Fig. 1. Fig. 3 is a front view of the same with one of the covers open. Figs. 4 and 5 are like views with other parts open. Fig. 6 is a plan view of the representation of an insect, used in connection with the device shown in Figs. 1 to 5. Fig. 7 is a side elevation of the representation of a different insect. Fig. 8 is a face view of a movable part of the insect. Figs. 9 to 13 inclusive, are front views of various modified forms, illustrating cross fertilization or fecundation of different plants. Fig. 14 is a front view of the improvement as arranged for direct fertilization; and Fig. 15 is a similar view of the improvement as arranged for dissemination or dispersion of seeds.

In the drawings the improvement is illustrated on a few typical plants, but it is understood that for demonstrating the different plants different mechanical mechanisms are necessary, and hence I do not limit myself to any especial construction shown in the drawings and hereinafter more fully described, it being understood that the invention consists mainly of a mechanical plant and means for actuating parts of the said plant so as to demonstrate fertilization, cross-fertilization, and the dissemination or dispersion of the seed.

As shown in Figs. 1 to 5 inclusive, the device is arranged to illustrate cross-fertilization of the plant known as *Andromeda*. The mechanical plant is represented by its flower only mounted on a suitable board A, on the front of which is hinged, at B', the cover B, which conforms to the outline of the flower and is painted or otherwise marked to represent as nearly as possible the outer surface or shell of the flower. As illustrated in Figs. 1, 2 and 3, this cover B can be swung open to one side so as to disclose a sectional view of the plant, this sectional view being partly represented by the shell C of the flower, and by a cover D hinged at its upper end, at D' to the board A, and adapted to be swung upward, as illustrated in Fig. 3, so as to disclose the stamens E grouped around the style F, the upper end of which is represented by the ovary G, adapted to be covered by a cover G' hinged at $G^2$ to the board A close to the hinge D' of the cover D.

As illustrated in Fig. 4, the stamens are drawn on the board A, with the exception of one stamen, E', which is made as a separate part and hinged at $E^2$ to the board A, as is plainly indicated in the said view. A rubber band $E^3$ or other spring, is connected with this pivoted stamen E' so as to hold the anther $E^4$ of this stamen in contact with the style F, as indicated in Fig. 4, a suitable stop being arranged to prevent this anther $E^4$ from passing over the said style as indicated in Figs. 3 and 4.

The anther $E^4$ of the pivoted stamen is adapted to close the mouth of a pocket H formed in the board A and containing a substance I, representing the pollen. It is understood that in nature the pollen is contained in the anther. Now it is evident that when a mechanical device representing an insect J having an extended tongue as shown in Fig. 6, is used and the rigid tongue of the insect is pressed against the anther E⁴, then the stamen E' moves outward and thereby uncovers the mouth of the pocket H and discloses and releases the pollen I, as shown in Fig. 5.

Now, it is understood that when in nature, an insect enters the flower to reach, with its tongue inserted among the stamens, the honey contained near the ovary, then the stamen is actuated and the pollen falls from the anther on the front end or other part of the insect's body and is carried by the insect to the stigma of other flowers for cross-fertilization.

In Fig. 9, is illustrated the flower of the plant known as "*Pogonia*" and this construction is for demonstrating the deposit of the pollen on any part of the insect's body. The insect J on its return movement out of the flower actuates with its back, a hinged cover K to expose a substance representing pollen contained in a pocket similar to the one above described and shown in Fig. 5.

In Fig. 10 is shown a representation of the flower of the plant known as "*Aristolochia*." In this device two flaps L and L' representing the interior of the neck of the flower, are pivoted in the board A at L² and their free ends are connected with cords N passing through apertures to the back of the board to be manipulated by the demonstrator; on the inner adjacent curved edges of the flaps are arranged angularly extending flexible pins L³ representing hairs. The insect J is pivoted on arm O pivoted on the board A to permit the demonstrator to pass the insect inward through the pins to reach the ovary. The insect is laden with pollen from another plant and is imprisoned at the ovary as the angular pins prevent exit. The insect sheds its pollen and receives the pollen of the flower and at the same time the demonstrator pulls the strings or cords N to swing the flaps outward to permit the exit of the insect.

In nature the hairs represented by the pins wither as soon as the pollen is shed, to permit the escape of the insect.

In Fig. 11, the insect manipulated by the demonstrator actuates the front end of a lever P to move the rear end of the said lever into contact with the body of the insect to deposit the pollen-like substance I contained in a pocket at the rear end of the lever onto the body of the insect. As illustrated in Figs. 7, 8, 9 and 11, the insect is provided with a lug J' for striking the cover K or lever P to actuate the same as described. I also provide the mechanical insect J, with a pivoted wing J², having on its front face two surfaces J³ and J⁴, of which one is painted to conform to the body of the animal, while the other J⁴ contains the representation of the pollen as the latter is deposited on the wings or body of the insect. This movable part J² is mounted to swing on the back of the representation of the insect J, over an aperture J⁵, so that either of the two surfaces J³ or J⁴ appears through the opening. As illustrated in Fig. 7, the part J³ appears through the opening J⁵ to show the natural state, but in demonstrating the pollen on the insect, the operator moves the wing J² downward, so that the other surface J⁴ appears in the opening J⁵, whereby the insect appears with pollen deposited on its body.

As illustrated in Fig. 12 the flower is provided with a filament made in the form of a flexible rod or tube Q attached at one end to the board A and carrying at its free end a receptacle Q' containing the pollen. A stop Q² engaging the receptacle holds the rod or tube in a bent position until the receptacle is disengaged from the stop. The flexible tube on releasing swings to its natural position as indicated in dotted lines in said figure, and in doing so the contents of the receptacle are thrown outward out of the flower.

In nature the insect on entering the flower loosens the filament to permit the tube to swing to discharge the pollen as above described.

In Fig. 13 an aquatic plant is represented in which the flower R is held on a coiled spring R' representing the stem of the flower and attached at its lower end on the board A. The upper end of the spring is connected with a string or cord R² extending through an aperture in the board A to the back of the latter to be operated by the demonstrator. The normal positions of the spring R' and the flower are shown in dotted lines. A plug R³ held on a string R⁴ also under the control of the operator is held loosely in a socket R⁵ arranged in the board A and when the operator pulls on the string R⁴ the plug R³ containing the pollen is moved upward and supported to scatter the pollen on the surface of the water represented in the board by lines, as shown. When the operator releases the string R² the spring R' returns the flower R to its normal position.

In nature the pollen is scattered on the surface of the water by the loosened male flower and is taken up by the female flower floating on the surface of the water. As soon as this is accomplished the stem of the plant coils up and draws the female flower under the water to ripen the seed.

From the foregoing it will be readily understood that the mechanical plant and the mechanical means for demonstrating cross-fertilization vary according to the particular plant to be imitated.

In Fig. 14 is illustrated direct or self-fertilization of a plant known as "gentian." The pistil S containing the young seed is drawn on the board A and on the upper end are formed the split flexible parts S', S², representing the stigma and held in a closed position by cords or strings S³ passing through apertures in the board A to the rear of the same to be under the control of the demonstrator. The flexible parts are so constructed that on releasing the strings the parts coil in opposite directions as shown in dotted lines in the said Fig. 14. The coiled parts pass onto the anthers $S^4$ so as to come in contact with the pollen carried by the anthers. It will be seen that in this case direct fertilization is easily demonstrated.

Dissemination or dispersion of seeds is illustrated in Fig. 15, in which a plant known as "crane's bill" is represented. The pistil T with a series of seed pouches T' at the base is drawn on the board A; but one pouch $T^2$ is hung on a flexible part $T^3$ adapted to coil up as shown in dotted lines when released from a pin $T^4$ secured in the board A. The seed $T^5$ in this pouch is thrown out on the coiling up of the pistil part, as illustrated in the said Fig. 15.

On the board A may be drawn or painted special parts of the respective plant to enable the demonstrator to fully explain the construction of the plant. As illustrated in Fig. 1, the board A, besides containing the mechanical plant as described, also contains a representation, on an enlarged scale, of the filament and anthers in cross section, as well as a representation on an enlarged scale, of the style and the anthers.

It is readily understood that the several parts of each plant are arranged to disclose the construction of the plant as well as to permit of moving the respective parts so as to demonstrate the fertilization, and cross-fertilization of flowers, and dissemination of seeds, including hygroscopism and hygrometric movement of fruits and seeds as aids in their dissemination and dispersion.

It is understood that the mechanism for the above purpose is varied for the different plants and I do not limit myself to any particular construction.

Having thus fully described my invention, I claim as new and desire to secure by Letters Patent—

1. An appliance for teaching botany comprising a mechanical representation of a plant having movable mechanical and pictorial floral parts, fruits, seed, seed receptacles and seed held normally in a locked position, and releasing devices for unlocking the movable parts, substantially as shown and described.

2. An appliance for teaching botany comprising a mechanical representation of a plant having movable mechanical and pictorial floral parts, fruits, seed, seed receptacles, and seed held normally in a locked position, and actuating devices for imparting movement to the movable parts, substantially as shown and described.

3. An appliance for teaching botany comprising a mechanical representation of a blossom having mechanical and movable pictorial parts; in combination with the mechanical representation of an insect adapted to adjust the movable parts of the blossom, substantially as shown and described.

4. An appliance for teaching botany comprising a mechanical representation of a blossom having mechanical and movable pictorial parts in combination with the mechanical representation of an insect having movable parts to indicate the reception of pollen upon said insect's body, substantially as shown and described.

WILLIAM HAMILTON GIBSON.

Witnesses:
 THEO. G. HOSTER,
 C. SEDGWICK.